United States Patent [19]

Oda

[11] Patent Number: 4,843,047

[45] Date of Patent: Jun. 27, 1989

[54] METHOD FOR PRODUCING A HIGH STRENGTH FELDSPATHIC PORCELAIN

[75] Inventor: Isao Oda, Nagoya, Japan

[73] Assignee: NGK Insulators, Ltd., Japan

[21] Appl. No.: 98,225

[22] Filed: Sep. 16, 1987

Related U.S. Application Data

[62] Division of Ser. No. 814,508, Dec. 30, 1985, Pat. No. 4,717,695.

[30] Foreign Application Priority Data

Jan. 18, 1985 [JP] Japan .................................. 60-7139

[51] Int. Cl.⁴ ............................................. C04B 33/24
[52] U.S. Cl. .................................... 501/143; 501/129; 501/130; 501/153; 264/66
[58] Field of Search ............... 501/143, 153, 129, 130; 264/66

[56] References Cited

U.S. PATENT DOCUMENTS

| | | | |
|---|---|---|---|
| 3,097,101 | 7/1963 | Lester | 501/143 |
| 3,431,126 | 3/1969 | Fukui | 501/143 |
| 3,674,519 | 7/1972 | Higuchi et al. | 501/153 |
| 3,846,098 | 11/1974 | Nakashima et al. | 501/144 |
| 3,860,432 | 1/1975 | Higuchi et al. | 501/153 |

FOREIGN PATENT DOCUMENTS 1453764  9/1966  France .
2056431  3/1981  United Kingdom .

*Primary Examiner*—Mark L. Bell
*Assistant Examiner*—Karl Group
*Attorney, Agent, or Firm*—Arnold, White & Durkee

[57] ABSTRACT

High strength porcelain having an unglazed bending strength of greater than 1,400 kg/cm² and consisting essentially of 22-85% by weight of $SiO_2$, 10-73% by weight of $Al_2O_3$, and 1.5-6.5% by weight of $K_2O$ and/or $Na_2O$. The porcelain has a total degree of crystallinity of more than 40% by weight, and a crystalline grain size of not greater than 20 μm, and it is free from defects of larger than 40 μm. The porcelain is produced by pulverizing a starting material mixture of quartz-feldspar-alumina system so that 85-95% by weight of particles thereof have a grain size of not greater than 10 μm, calcining the mixture, adding clay-mineral material therein, pulverizing so that the clay-mineral-added mixture contains less than 85% by weight of particles with a grain size of not greater than 10 μm, forming, drying, and firing at 1,100°-1,400° C.

20 Claims, 5 Drawing Sheets

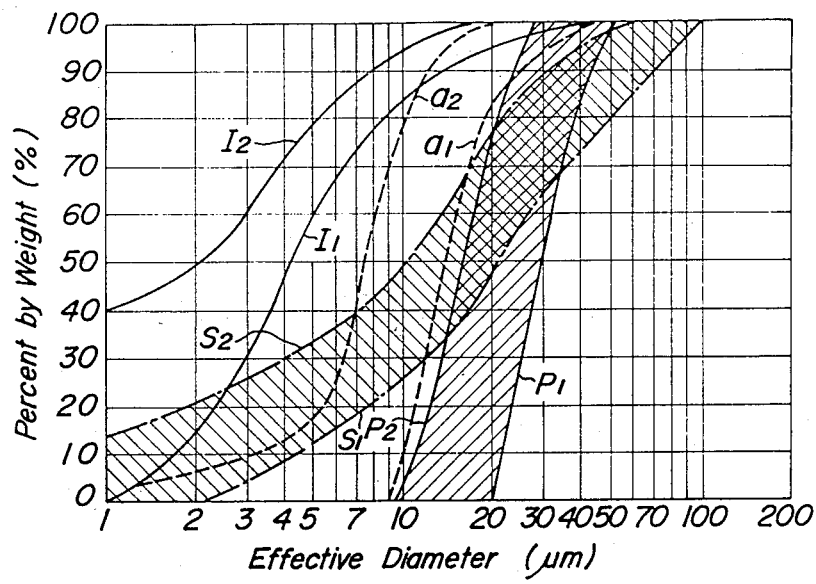
FIG_1
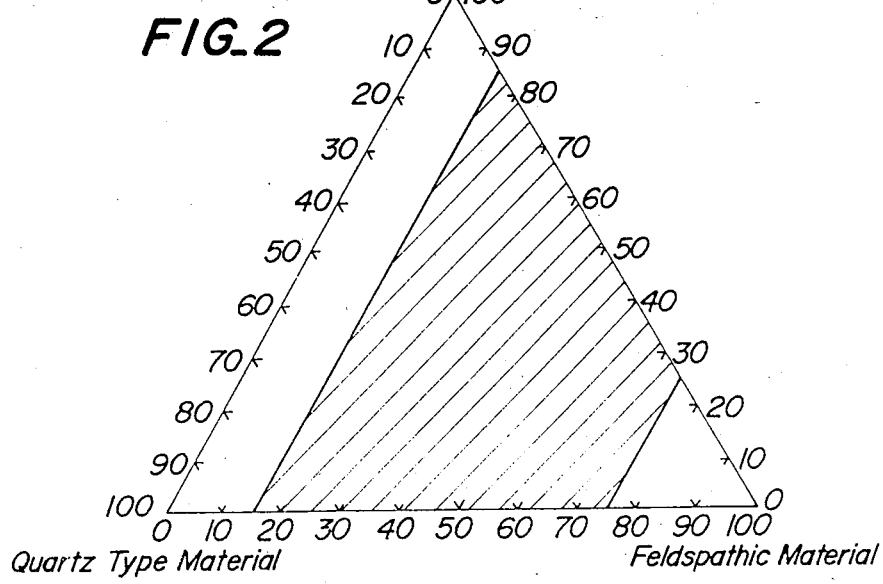
FIG_2

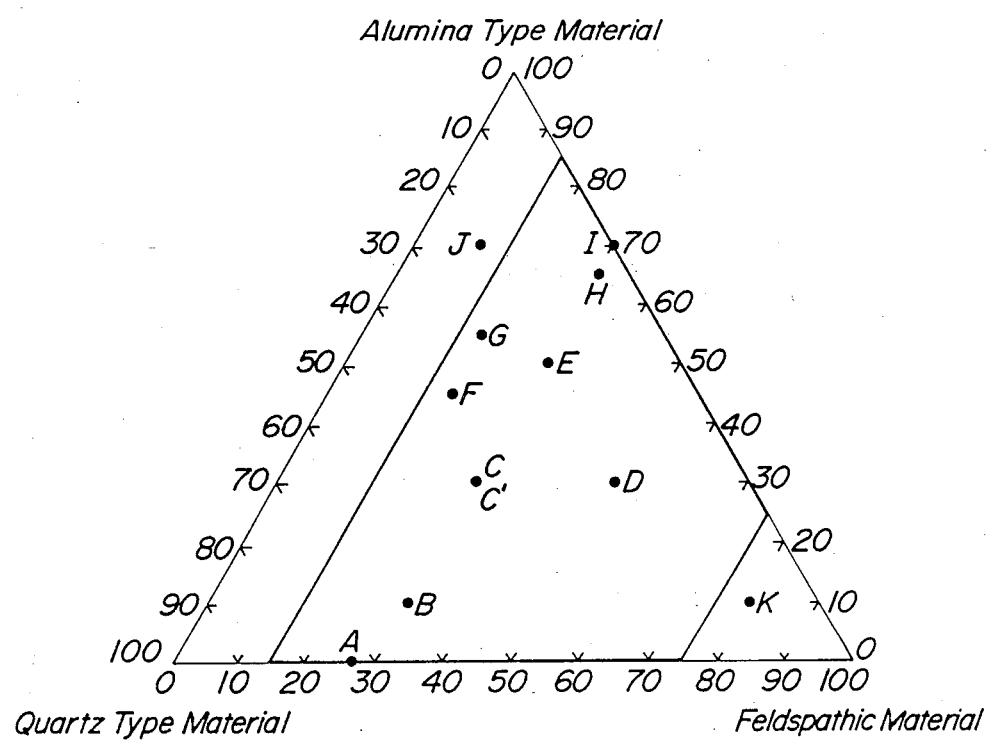

FIG_6
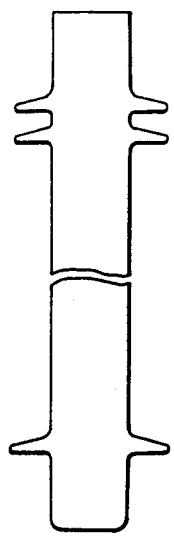
FIG_7
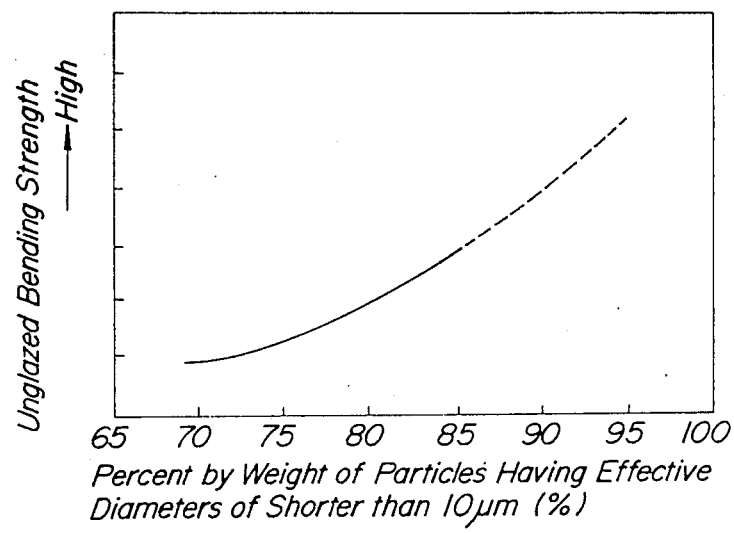
Percent by Weight of Particles Having Effective Diameters of Shorter than 10μm (%)

ately, the particle size of the starting material
METHOD FOR PRODUCING A HIGH STRENGTH FELDSPATHIC PORCELAIN This is a Division of application Ser. No. 814,508 filed Dec. 30, 1985, U.S. Pat. No. 4,717,695 allowed July 13, 1987.

BACKGROUND OF THE INVENTION

1. Field of the Invention

This invention relates to a high strength feldspathic porcelain and a method for producing the same. More particularly, the invention relates to high strength feldspathic porcelain having a fine, homogeneous microstructure and being suitable for large high-voltage insulators and acid resisting porcelain, and the invention also relates to a special method for producing such porcelain.

2. Related Art Statement

Two kinds of feldspathic porcelain are used in producing high-voltage insulators; namely, common porcelain and alumina-containing porcelain. The common porcelain consists essentially of quartz-type material, feldspathic material, and clay-mineral material, while the alumina-containing porcelain consists essentially of quartz-type material, feldspathic material, alumina-type material, and clay-mineral material.

FIG. 7 shows the relationship between porcelain strength and the grain size of a starting material mixture therefor the case of common porcelain made of quartz-type material, feldspathic material, and clay-mineral material. The ordinate represents unglazed bending strength of porcelain, while the abscissa represents the percentage by weight of particles with an effective diameter of not greater than 10 μm. As can be seen from FIG. 7, the strength of porcelain tends to increase with the reduction of the particle size of starting material therefor. The reason for such increase of the porcelain strength is in that the use of finer material results in a more homogeneous microstructure in the porcelain. Such tendency is recognized in both the common porcelain and the alumina-containing porcelain.

On the other hand, it is empirically known in the art of porcelain production that the finer the particle size of the starting material, the more likely the occurrence of cracks in the drying and firing processes. In general, when the content of particles with effective diameters of not greater than 10 μm surpasses 85% by weight (to be referred to as % hereinafter), the crack tends to occur in the above processes. Accordingly, the particle size of porcelain material has been controlled so that the content of particles with effective diameters of not greater than 10 μm is less than 85% in both common porcelain and alumina-containing porcelain.

The above "cracks" occurring in the drying or firing process refers to those cracks which can be caused at strained portions of the porcelain by the difference of expansion and shrinkage between the inside and the surface thereof due to temperature differences therebetween during the drying and firing processes. The strained portions include both inside strains caused during kneading and extrusion as a result of difference of particle orientation and density between the inside and the surface of body material and the surface strains caused during cutting the working of the body. Thus, the cracks discussed in the description of the invention refers to cracks formed in the inside and on the surface of the porcelain during the drying and firing processes.

In short, the feldspathic porcelain of the prior art has a shortcoming in that, when the particle size of the starting material is very fine, the risk of crack occurrence becomes high, and such risk is further increased when such porcelain is used in making large high-voltage insulators or the like in which the temperature difference between the inside and the surface of the porcelain is large.

Accordingly, the particle size of the starting material is restricted to be larger than a certain value, which restriction is reflected in a limitation of the homogeneity of the porcelain microstructure and a comparatively low mechanical strength of porcelain. For instance, the three-point bending strength of an unglazed test piece with a 12 mm diameter for insulator porcelain is about 1,000 kg/cm$^2$ in case of common porcelain and about 1,400 kg/cm$^2$ in case of alumina-containing porcelain containing 20% of corundum. If the particle size of the starting material is made very fine, cracks occur in the drying process and/or firing process of porcelain production as pointed out above. Thus, for products which require a high mechanical strength, such as large high-voltage insulators, special measures have been taken, for example, adding a large amount of corundum or by applying static hydraulic pressure onto the body for densification followed by carving an insulator out of the densified body. Such special measures result in an increse in the production cost or a complication of the production process.

SUMMARY OF THE INVENTION

Therefore, an object of the invention is to obviate the above-mentioned shortcomings of the prior art by providing a novel high strength feldspathic porcelain having a more homogeneous microstrucrure known before so as to improve the strength thereof.

Another object of the invention is to provide a method for producing high strength feldspathic porcelain which eliminates the occurrence of cracks in the drying and firing processes even when the starting material having a very fine particle size is used. The method of the invention costs less than conventional porcelain producing methods and does not require a complicated production process.

A preferred embodiment of the high strength feldspathic porcelain according to the invention has a crystal phase whose grain size is smaller than 20 μm and whose total degree of crystallization is higher than 40% by weight, whereby the unglazed bending strength of the porcelain is greater than 1,400 kg/cm$^2$ and the porcelain is free from defects larger than 40 μm.

Such high strength feldspathic porcelain can be produced by a method according to the invention in the following manner. Namely, a starting material is (1) pulverized so as to produce such particle size distribution of which 85–95% by weight has an effective diameter smaller than 10 μm; after being (2) calcined the pulverized material is; (3) mixed with clay-mineral material; the mixture is (4) pulverized so that less than 85% of the particles thereof have effective diameters smaller than 10 μm, and the thus pulverized mixture is formed, dried, and fired through similar steps to those of regular porcelain production. The steps (3) and (4) in the aforementioned process may be interchanged.

The strength of the high strength feldspathic porcelain of the invention is 30–40% higher than that of conventional porcelains of similar types. More particularly, the three-point bending strength of an unglazed test piece with a 12 mm diameter for the porcelain of the invention is 1,400 kg/cm$^2$ in the case of a common porcelain composition, 1,800 kg/cm$^2$ in the case of an alumina-containing porcelain composition containing 20% of corundum, 2,100 kg/cm$^2$ in case of an alumina-containing porcelain composition containing 30% of corundum, and 2,900 kg/cm$^2$ in case of an alumina-containing porcelain composition containing 50% of corundum.

The invention will be described in further detail now. With the invention, the microstructure of porcelain is made more homogeneous than before, so as to improve the strength thereof. To this end, fine materials of porcelain, except clay-mineral materials are pulverized so that more than 85% thereof have effective diameters not greater than 10 μm and then calcined to sinter them. The mixture of calcined material and clay-mineral material is pulverized while controlling its particle size distribution so that the content of particles with effective diameters not greater than 10 μm is less than 85%. Whereby, although more than 85% of the starting materials before the calcination are fine particles with effective diameters not greater than 10 μm, regular porcelain making steps, such as kneading, extruding, drying, and firing, can be effected in a manner similar to those of the conventional method.

The starting materials to be used in the present invention are quartz type materials such as siliceous sand, feldspathic materials such as potash feldspar, and alumina type materials such as α-Al$_2$O$_3$. The starting materials are pulverized by a conventional pulverizing method of porcelain materials, so as to produce a particle size distribution of which 85–95% are particles with effective diameters of not greater than 10 μm. The above pulverization can be effected either (i) on each of the starting materials followed by mixing of the pulverized materials for producing a predetermind composition for calcination, or (ii) on a mixture of the starting materials at the predetermined composition for calcination. The selection of the pulverization either before or after the above mixing depends on the scale of the production and the manufacturing facilities available.

The particle size in terms of the Stokes diameter, which is generally referred to as the effective diameter, is determined by the sedimentation method.

FIG. 1 shows the particle size distribution of the starting materials used in the invention. For comparison, the particle size distributions of quartz type material in both common porcelain and alumina-containing porcelain of the prior art are also depicted therein. In this figure, the abscissa represents the effective diameter of particle, while the ordinate represents the percentage by weight of particles whose effective diameters are not greater than the effective diameters indicated on the abscissa. Table 1 shows the range of particle size distributions of the starting materials used in the invention, which range corresponds to that between the curves I$_1$ and I$_2$ of FIG. 1.

TABLE 1

| Effective diameter | Particle size distribution, in percentage by weight of particles not greater than designated effective diameter (%) | |
| --- | --- | --- |
| (μm) | Coarse side limit | Fine side limit |
| 1 | 0 | 40 |
| 2 | 15 | 49 |
| 3 | 30 | 60 |
| 5 | 60 | 80 |
| 7 | 75 | 88 |

TABLE 1-continued

| Effective diameter | Particle size distribution, in percentage by weight of particles not greater than designated effective diameter (%) | |
| --- | --- | --- |
| (μm) | Coarse side limit | Fine side limit |
| 10 | 85 | 95 |
| 20 | 95 | 100 |
| 30 | 98 | 100 |
| 50 | 100 | 100 |

In FIG. 1, the range between the curves S$_1$ and S$_2$ indicates that particle size distribution of the quartz type material which is generally used in porcelain for insulators. The range between the curves a$_1$ and a$_2$ indicates that known particle size distribution of the quartz type material which has been disclosed by U.S. Pat. No. 3,097,101. The range between the curves P$_1$ and P$_2$ indicates that known particle size distribution of the quartz type material which has been disclosed by Japanese Patent Publication No. 22,807/1973. In contrast to such known particle size distributions, the range between the curves I$_1$ and I$_2$ represents the particle size distributions of those quartz-type materials, feldspathic materials, and alumina-type materials which are used in the present invention. As can be seen from FIG. 1, the particle size of the quartz-type materials used in the invention is finer than that of conventionally used quartz-type materials. The particle sizes of those feldspathic materials and alumina-type materials which are used in the invention are also finer than those of the prior art.

FIG. 2 shows the blend composition of material calcined (to be referred to as "calcination material") which consists of quartz-type material, feldspathic material, and alumina-type material. The shaded portion of FIG. 2 represents a preferred composition of the calcination material to be used in the invention which composition consists of not greater than 85% of quartz-type material, 15–75% of feldspathic material, and not greater than 85% of alumina type material. The particle size distribution of a starting material mixture with such composition is controlled so that 85–95% of particles thereof have effective diameters of not greater than 10 μm as shown in FIG. 1 and Table 1. The starting material mixture with the preferred blend composition and the proper particle size distribution is calcined at 900°–1,400° C., so as to provide the calcination materials.

The reason for calcining the finely pulverized starting material in the present invention is two fold; namely, to homogenize the microstructure of the porcelain and to prevent the cracking in later steps of porcelain production by controlling the particle size of secondary powder particles to be made by pulverizing the calcined material.

The calcined material is mixed with clay-mineral material. The mixing may be effected by any of the following three methods depending on circumstances. Namely, (i) to pulverize the calcined material and then mix it with clay-mineral material, (ii) to mix the calcined material with clay-mineral material and then pulverize the mixture, and (iii) to mix the calcined material with a part of the clay-mineral material for pulverizing the mixture and add the remainder of the clay-mineral material into the pulverized mixture.

In a preferred embodiment of the invention, the particle size of a mixture consisting of 45–80% of the calcined material and 20–55% of the clay-mineral material is controlled so that not greater than 85% of the particles have effective diameters of not greater than 10 μm. A desired high strength feldspathic porcelain can be made from the thus particle-size-controlled mixture by following the steps of kneading, extruding, forming, drying, and firing at 1,100°–1,400° C. in a manner similar to the corresponding steps of any suitable conventional method.

The crystal phase of the high strength feldspathic porcelain according to the invention is formed from at least one crystal phase selected from the group consisting of corundum, mullite, cristobalite, and quartz. A preferred crystal composition consists of not greater than 60%, more preferably 20–60%, of corundum, 5–50% of mullite, not greater than 40% of cristobalite, and not greater than 10% of quartz.

The reasons for various limitations of the invention will be described now.

The blend composition of the major ingredients of the high strength feldspathic porcelain is limited to 22–85% of $SiO_2$, 10–73% of $Al_2O_3$, 1.5–6.5% of $K_2O$ and/or $Na_2O$ due to the following reasons. Namely, the above blend composition is selected in order to provide desired performance characteristics of the porcelain and to obtain a body which can be easily extruded, molded, and fired. The performance characteristics considered include, in the main, mechanical properties, thermal properties, and electric properties, such as the bending strength, the coefficient of thermal expansion, volume resistivity, and the like.

If the content of $SiO_2$, which is mainly introduced from the silica type material and the clay-mineral material, is less than 22% or more than 85%, the body becomes hard to extrude, form, and fire. If the content of $Al_2O_3$, which is mainly introduced from the clay-mineral material, is less than 10%, the extrusion and forming become difficult, while if it exceeds 73%, the firing temperature becomes too high and the baking process becomes difficult. If the content of $K_2O$ and/or $Na_2O$, which are mainly introduced from feldspathic material, is less than 1.5%, the firing becomes difficult, while if it exceeds 6.5%, the content of glass in the porcelain becomes too high and the porcelain tends to be softened during firing, so that stable production of porcelain of complicated shapes becomes difficult.

In order to produce the desired performance characteristics of the porcelain, the crystal phase of the high strength feldspathic porcelain is restricted to at least one type of crystal selected from the group consisting of corundum, mullite, cristobalite, and quartz.

The crystal phase, in terms of percentage by weight, is limited to not greater than 60% of corundum, 5–50% of mullite, not greater than 40% of cristobalite, nd not greater than 10% of quartz due to the following reasons. Namely, more than 60% of corundum makes the firing difficult. If the content of mullite is less than 5%, the strength of the porcelain becomes insufficient, while if it surpasses 50%, the firing becomes difficult. If the content of cristobalite exceeds 40%, the coefficient of thermal expansion of the porcelain becomes too large resulting in a high inside stress of the porcelain and the strength of the porcelain is reduced. More than 10% of quartz makes the strength of the porcelain insufficient.

The total amount of crystalline phase is restricted to be more than 40% by weight, because if it is less than 40% by weight, porcelain with excellent mechanical and electrical properties cannot be produced. For example, with the increase of the total amount of crystalline phase, the mechanical properties such as the bending strength and the toughness as well as the electrical properties such as the volume resistivity and insulating strength are improved. Since the starting material of the high strength feldspathic porcelain of the invention are very fine particles, i.e. 85–95% thereof having a particle size of not greater than that 10 μm, a low total amount of crystalline phase of less than 40% results in a large deformation of the porcelain during the firing, and stable production of high-voltage insulators of complicated shapes becomes difficult. The degree of crystallinity was determined by the quantitative X-ray diffraction method, and the peak diffractions for the individual crystals measured were corundum (113), mullite (220), cristobalite (101), and quartz (100).

The size of the crystals is restricted to be not greater than 20 μm because crystals larger than 20 μm cannot produce a homogeneous microstructure and cannot provide the desired high strength procelain. The starting materials of the porcelain of the invention are in the form of very fine particles, i.e., with the particle size distribution of 85–95% having an effective diameter of not greater than 10 μm and 5–15% having an effective diameter of larger than 10 μm, such particles are molten and reacted during firing, so that crystals larger than 20 μm hardly remain in the porcelain. The inventors confirmed by an optical microscope and a scanning electron microscope that the crystals of the porcelain of the invention were not greater than 20 μm.

The defects in the porcelain are restricted to be not greater than 40 μm because defects larger than 40 μm reduce the porcelain strength and hamper production of high strength porcelain. The "defects" refer to foreign material and pores in the porcelain. The foreign matter is substance which is different from proper materials of the porcelain, and most of such foreign matter enters into the porcelain during body the manufacturing process. In a peferred method of the invention, the mesh of the final sieve for the molding slip mixture of the calcined material and the clay-mineral material is 44 μm, so that foreign material passing the final sieve melt when the porcelain is fired and the fired porcelain is free from residual foreign material larger than 40 μm. The magnitude of the pore depends on the method of porcelain production, and the method according to the invention ensures that the pores in the porcelain produced thereby are not greater than 40 μm. The inventors confirmed by an optical microscope and a scanning electron microscope that the foreign material and pores in the porcelain of the invention were not greater than 40 μm.

The unglazed bending strength of the high strength feldspathic porcelain according to the invention is restricted to be more than 1,400 $kg/cm^2$, because when the strength of feldspathic porcelain is improved by restricting the blend composition, the crystal phase, the degree of crystallinity, and the microstructure thereof in the aforesaid manner, such unglazed bending strength is achieved. More particularly, an unglazed bending strength of more than 1,400 $kg/cm^2$ is obtained when a high strength feldspathic porcelain satisifes the following conditions; namely, on the basis of weight, the porcelain consists essentially of 22–85% of $SiO_2$, 10–73% of $Al_2O_3$, and 1.5–6.5% of $K_2O$ and/or $Na_2O$; the porcelain has a crystal phase formed of at least one crystal phase selected from the group consisting of corundum, mullite, cristobalite, and quartz, a total degree of crystallinity of the crystal phase being more than 40%, the degree of crystallization for the crystals being selected in ranges of not greater than 60% for corundum, 5–50% for mullite, not greater than 40% for cristobalite, and not greater than 10% for quartz, grain size of the crystals being smaller than 20 μm, and the porcelain being free from defects larger than 40 μm. The "unglazed bending strength" as used in the invention refers to that bending strength of an unglazed test piece with a 12 mm diameter at which the test piece is broken in a three-point bending test with a 100 mm span, the bending test being carried out by using a loading machine at a crosshead speed of 0.5 mm/min.

High strength feldspathic porcelain with an unglazed bending strength of 1,800 kg/cm$^2$ is restricted to have a blend composition which consists essentially of 30–60% of $SiO_2$, 30–73% of $Al_2O_3$, not greater than 1.5% of $Fe_2O_3$, not greater than 1.5% of $TiO_2$, not greater than 0.7% of CaO, not greater than 0.5% of MgO, and 1.5–6.5% of $K_2O$ and/or $Na_2O$ and to contain 20–60% of corundum in crystal phase thereof. Such porcelain is developed for large high-voltage insulators, so that 30–60% of $SiO_2$ and 30–73% of $Al_2O_3$ are necessary to render a high moldability; not greater than 1.5% of $Fe_2O_2$ is necessary for electric insulation; and not greater than 1.5% of $TiO_2$, and not greater than 0.7% of CaO, and not greater than 0.5% of MgO are necessary to facilitate the firing of large porcelain insulators. The reason for the restriction of 1.5–6.5% of $K_2O$ and/or $Na_2O$ is the same as described above. When the content of corundum crystals is less than 20% the three-point bending strength of an unglazed test piece with a 12 mm diameter becomes not greater than 1,800 kg/cm$^2$, while if it is more than 60% the firing becomes difficult.

The inventors have also found that the above high strength feldspathic porcelain with an unglazed bending strength of 1,800 kg/cm$^2$ can be obtained by using a blend composition which consists essentially of 30–60% of $SiO_2$, 30–73% of $Al_2O_3$, not greater than 1.5% of $Fe_2O_3$, not greater than 1.5% of $TiO_2$, not greater than 0.7% of CaO, not greater than 0.5% of MgO, 1.5–6.5% of $K_2O$ and/or $Na_2O$, and not greater than 20% of at least one oxide selected from the group consisting of $TiO_2$, BaO, $ZrO_2$, $B_2O_3$, and ZnO. In addition to the quartz-type material, feldspathic material, alumina-type material, and clay-mineral material, if not greater than 20% of at least one ingredient or reagent selected from the group consisting of $TiO_2$, BaO, $ZrO_2$, and ZnO is used, the above unglazed bending strength can be achieved, but if the content of such additional ingredient or reagent is more than 20% the extrusion, forming, and firing of the porcelain becomes difficult.

The starting material of the porcelain of the invention is restricted to be at least one material selected from the group consisting of quartz-type material, feldspathic material, and alumina-type materials, because such materials can produce porcelain having the desired physical and chemical properties. The starting material is also required to be pulverized so that 85–95% thereof are in the form of particles with effective diameters of not greater than 10 μm, because if such fine particles are not greater than 85% the desired strength of the porcelain cannot be achieved, while if they are more than 95% extra pulverizing time is consumed without producing any improvement in the porcelain strength.

In a method for producing high strength feldspathic porcelain according to the invention, the blend composition of the above-mentioned calcination material is restricted to be not greater than 85% by weight of quartz-type material, 15–75% by weight of feldspathic material, and not greater than 85% by weight of alumina-type material. The dominant reason for selecting such blend composition is the content of the feldspathic material. If the content of feldspathic material is less than 15%, a dense structure of porcelain cannot be obtained even after firing a mixture of the calcined material and the clay-mineral material, while if the content of feldspathic material exceeds 75%, the porcelain tends to be softened during the firing step and stable production of large high-voltage insulators is hampered.

As long as proper plasticity of the body is ensured by mixing a sufficient amount of clay-mineral material with the pulverized calcination material, clay-mineral material containing more than 85% of fine particles with effective diameters not greater than 10 μm and other chemical substances may be added to the calcination material, provided that the homogeneity of the porcelain microstructure is not deteriorated thereby. The above-mentioned other chemical substances are, for example, $TiO_2$, BaO, $ZrO_2$, $B_2O_3$, ZnO, etc.

The calcining temperature is restricted to be 900°–1,400° C., because if the calcining temperature is below 900° C. the sintering effect is insufficient for producing a homogeneous microstructure in the calcined material, while if it is above 1,400° C. foaming is caused and fine homogeneous microstructure is not produced in the calcined material.

As to the blend composition of the body made by mixing the clay-mineral material with the pulverized calcined material, it has been found that a ratio of 45–80% by weight and the calcined material and 20–55% by weight of the clay-mineral material is preferable. The dominant reason for it is in the content of the clay-mineral material, and if such content is less than 20% or more than 55%, the plasticity of the body becomes insufficient and extrusion and forming of the body become difficult.

The firing temperature of the mixture of the calcined material and the clay-mineral material is restricted to be 1,100°–1,400° C. If the firing temperature is below 1,100° C., a well sintered porcelain cannot be obtained, while if it is higher than 1,400° C. foaming occurs and stable production of porcelain is hampered.

BRIEF DESCRIPTION OF THE DRAWINGS

For a better understanding of the invention, reference is made to the accompanying drawings, in which:

FIG. 1 is a graph showing the particle size distribution of the materials of the porcelain according to the invention, in comparison with those of quartz type materials for common porcelain and alumina-containing porcelain of the prior art;

FIG. 2 is a diagram showing the composition range of starting materials to be used in the invention, which starting materials include quartz-type material, feldspathic materials, and alumina-type material;

FIG. 4 is a graph showing the quartz-feldspar-alumina compositions of Samples used in the examples to be described hereinafter;

FIG. 6 is a diagrammatic illustration of a solid insulator with shades; and

FIG. 7 is a graph showing the relationship between the bending strength of a test piece and the partcle size of the starting material thereof in the case of common porcelain made of quartz-type material, feldspathic material, and clay-mineral material.

DESCRIPTION OF THE PREFERRED EMBODIMENTS

The invention will be described in further detail by referring to examples.

EXAMPLE 1

Figure 3:
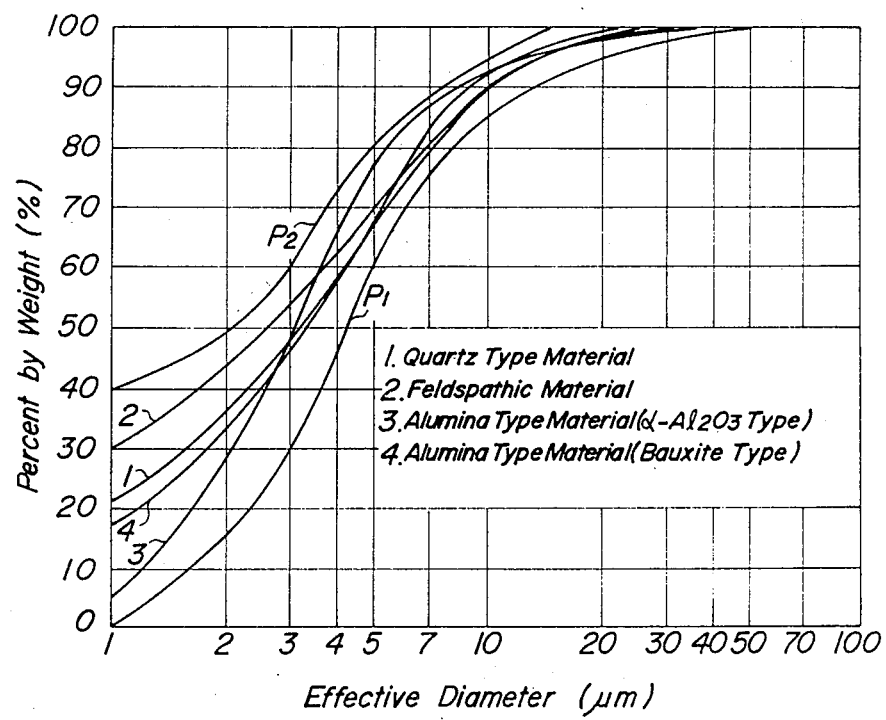
FIG. 3 is a graph showing the particle size distributions of quartz-type material, feldspathic material, and alumina-type material which were used in the examples of porcelain of the invention as described hereinafter.

Four starting materials were selected; namely, siliceous sand as the quartz type material, potash feldspar as the feldspathic material, and $\alpha$-$Al_2O_3$ and bauxite as the alumina type material. Additionally, gaerome clay was selected as the clay-mineral material. The four starting materials were individually pulverized in a ball mill by a wet process. The gaerome clay was elutriated and 95% of particles thereof had a particle size of not greater than 10 $\mu$m, so that pulverization of this clay was not necessary. The particle size distribution of each of the above four starting materials after the pulverization is shown in FIG. 3 and Table 2.

TABLE 2

| Effective diameter ($\mu$m) | Particle size distribution, in percentage by weight of particles not greater than designated effective diameter (%) | | | |
| --- | --- | --- | --- | --- |
|  | Siliceous sand | Potash feldspar | $\alpha$-$Al_2O_3$ alumina | Bauxite |
| 1 | 21 | 30 | 5 | 17 |
| 2 | 36 | 43 | 28 | 32 |
| 3 | 48 | 54 | 48 | 46 |
| 5 | 66 | 70 | 76 | 67 |
| 7 | 79 | 80 | 87 | 82 |
| 10 | 89 | 89 | 93 | 92 |
| 20 | 99 | 98 | 98 | 99 |
| 30 | 100 | 100 | 99 | 100 |
| 50 | 100 | 100 | 100 | 100 |

Starting material mixtures for calcination were prepared by mixing the quartz-type material, the feldspathic material, and the alumina-type material by using nine compositions A through I of FIG. 4. After being mixed by a wet process with a ball mill, each of the above mixtures was dried by an electric drier and calcined at 1,150°–1,300° C. in a ELEMA electric furnace. In FIG. 4, Sample C′ was made by adding 5% of ZnO into the composition of Sample C by extrapolation and then calcining.

The clay-mineral material, i.e., gaerome clay in this case, was mixed with the calcined material of each of the Samples A through I at ratios of Table 3, and each mixture thus produced was pulverized by a wet process with a ball mill so that 80% of the particles in each Sample thereof had particle sizes of not greater than 10 $\mu$m. After deferrization by a ferro filter, each casting slip consisting of the mixture of the calcined material and the gaerome clay was sifted through a 44 $\mu$m mesh sieve for dehydration by a filter press, kneaded by a vacuum kneader, and extruded. A test piece with a 12 mm diameter for each sample was molded from the kneaded body, dried and fired at 1,300°–1,350° C. in a continuous firing furnace. Whereby, ten kinds of porcelain Samples A through I were produced and Table 3 shows the properties of such Samples.

Each of Reference Samples J and K of Table 3 had a calcination material composition falling outside of the range of the invention as shown in FIG. 2 and FIG. 4, but the starting materials and the equipment and conditions for production were the same as those for Samples A through I of the invention. Thus, Reference Samples J and K were made by the method of the invention except the blend composition thereof.

Reference Samples L through N of Table 3 were made by a prior art method. Namely, three ingredients, i.e., siliceous sand as the quartz-type material, albite as the feldspathic material, and $\alpha$-$Al_2O_3$ as the alumina-type material, were mixed at the ratios shown in Table 3, and each of the mixtures was pulverized by a ball mill through a wet process so as to make particle size of 70–80% of particles thereof not greater than 10 $\mu$m after being further mixed with gaerome clay. Gaerome clay as the clay-mineral material was then added to each of the pulverized mixture by mixing them in a ball mill through a wet process, and the casting slip produced thereby was passed through a ferro filter for deferrization. Each casting slip was dehydrated by a filter press using a 88 $\mu$m mesh sieve, kneaded, and extruded so as to produce a test piece with a 12 mm diameter. After being dried, each test piece was fired at 1,300°–1,350° C. in a continuous firing furnace.

As to the properties listed in Table 3, the degree of crystallization was measured by the quantitative X-ray diffraction method, and the blend composition was determined by wet chemical quantitative analysis. The sizes of the crystals and defects were determined by observation through an optical microscope and a scanning electron microscope. The bending strength of the unglazed test piece with a 12 mm diameter was measured by the three-point bending method with a 100 mm span while using a loading tester, the loading speed being 0.5 mm/min in terms of its crosshead speed. The coefficient of thermal expansion was measured by using a mirror type thermal expansion meter based on the principle of optical leverage, and the specimen for this measurement was dimensioned 4 mm dia.×50.00 mm. Of the electric properties, the volume resistivity, the dielectric constant, and the dielectric loss tangent were measured by the method of JIS (Japanese Industrial Standard) C2141; and the insulating strength was measured in accordance with VDE (Verband Deutscher Elektrotechniker)-0335. The acid resistivity was measured by the JIS powder method of JIS R1503.

TABLE 3(a)

| Composition and properties | Invention | | | | | | | | | | Reference | | | | |
| --- | --- | --- | --- | --- | --- | --- | --- | --- | --- | --- | --- | --- | --- | --- | --- |
|  | A | B | C | C′ | D | E | F | G | H | I | J | K | L | M | N |
| Composition of calcined material (%) | | | | | | | | | | | | | | | |
| Quartz type | 73 | 60 | 40 | 40 | 20 | 20 | 36 | 27 | 5 | 0 | 20 | 10 | — | — | — |

TABLE 3(a)-continued

| Composition and properties | Invention | | | | | | | | | | Reference | | | | |
|---|---|---|---|---|---|---|---|---|---|---|---|---|---|---|---|
| | A | B | C | C' | D | E | F | G | H | I | J | K | L | M | N |
| Feldspathic | 27 | 30 | 30 | 30 | 50 | 30 | 19 | 18 | 30 | 30 | 10 | 80 | — | — | — |
| Alumina ($\alpha$-$Al_2O_3$) type | 0 | 0 | 0 | 0 | 0 | 0 | 45 | 55 | 60 | 70 | 70 | 10 | — | — | — |
| Alumina (bauxite) type | 0 | 10 | 30 | 30 | 30 | 50 | 0 | 0 | 0 | 0 | 0 | 0 | — | — | — |
| ZnO reagent (extrapolation) | 0 | 0 | 0 | 5 | 0 | 0 | 0 | 0 | 0 | 0 | 0 | 0 | — | — | — |
| Calcining temperature (°C.) | 1,150 | 1,200 | 1,200 | 1,200 | 1,200 | 1,200 | 1,150 | 1,200 | 1,300 | 1,300 | 1,200 | 1,150 | — | — | — |
| Ratio of starting materials (%) | | | | | | | | | | | | | | | |
| Calcined material | 63 | 63 | 63 | 63 | 63 | 63 | 69 | 70 | 68 | 66 | 70 | 63 | — | — | — |
| (Quartz type) | | | | | | | | | | | | | 37 | 30 | 10 |
| (Feldspathic) | | | | | | | | | | | | | 28 | 24 | 32 |
| (Alumina type) | | | | | | | | | | | | | 0 | 10 | 20 |
| Clay-mineral material | 37 | 37 | 37 | 37 | 37 | 37 | 31 | 30 | 32 | 34 | 30 | 37 | 35 | 36 | 38 |

TABLE 3(b)

| Composition and Properties | Invention | | | | | | | | | | Reference | | | | |
|---|---|---|---|---|---|---|---|---|---|---|---|---|---|---|---|
| | A | B | C | C' | D | E | F | G | H | I | J | K | L | M | N |
| Porcelain chemical composition (%) | | | | | | | | | | | | | | | |
| $SiO_2$ | 79.1 | 72.3 | 60.0 | 58.0 | 56.1 | 47.7 | 51.4 | 44.6 | 35.7 | 33.0 | 35.8 | 62.7 | 76.6 | 67.3 | 53.9 |
| $Al_2O_3$ | 16.8 | 23.1 | 34.9 | 33.7 | 36.8 | 46.8 | 45.3 | 52.2 | 60.1 | 62.8 | 62.0 | 28.7 | 17.9 | 27.8 | 39.9 |
| $Fe_2O_3$ | 0.7 | 0.8 | 0.9 | 0.8 | 0.9 | 1.0 | 0.5 | 0.5 | 0.5 | 0.6 | 0.5 | 0.7 | 0.6 | 0.6 | 0.7 |
| $TiO_2$ | 0.3 | 0.5 | 0.9 | 0.9 | 0.9 | 1.3 | 0.3 | 0.3 | 0.3 | 0.3 | 0.3 | 0.3 | 0.3 | 0.3 | 0.3 |
| CaO | 0.1 | 0.1 | 0.1 | 0.1 | 0.1 | 0.1 | 0.1 | 0.1 | 0.1 | 0.1 | 0.1 | 0.2 | 0.1 | 0.1 | 0.1 |
| MgO | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| $K_2O$ | 2.3 | 2.4 | 2.4 | 2.3 | 3.9 | 2.3 | 1.7 | 1.6 | 2.3 | 2.3 | 0.8 | 5.5 | 3.4 | 2.9 | 3.7 |
| $Na_2O$ | 0.6 | 0.7 | 0.7 | 0.6 | 1.2 | 0.7 | 0.6 | 0.6 | 0.9 | 0.8 | 0.4 | 1.8 | 1.0 | 0.9 | 1.2 |
| ZnO | 0.0 | 0.0 | 0.0 | 3.5 | 0.0 | 0.0 | 0.0 | 0.0 | 0.0 | 0.0 | 0.0 | 0.0 | 0.0 | 0.0 | 0.0 |
| Crystals in porcelain (%) | | | | | | | | | | | | | | | |
| Mullite | 14.5 | 17.6 | 24.0 | 35.2 | 25.7 | 34.6 | 12.1 | 22.1 | 8.4 | 8.0 | 16.2 | 10.5 | 13.8 | 15.2 | 16.0 |
| Cristobalite | 32.1 | 25.0 | 12.5 | 5.1 | 0.6 | 0.5 | 14.9 | 4.9 | 0.0 | 0.0 | 3.8 | 0.0 | 7.6 | 1.0 | 0.0 |
| Quartz | 8.7 | 4.0 | 1.6 | 0.0 | 1.0 | 0.8 | 1.4 | 1.2 | 0.0 | 0.0 | 9.1 | 0.0 | 13.0 | 8.0 | 1.0 |
| Corundum | 0.0 | 5.0 | 12.8 | 8.5 | 14.8 | 18.8 | 32.4 | 38.2 | 48.0 | 49.2 | 51.3 | 5.6 | 0.0 | 11.5 | 20.8 |
| Total crystals | 55.3 | 51.6 | 50.9 | 48.8 | 42.1 | 54.7 | 60.8 | 66.4 | 56.4 | 57.2 | 80.4 | 16.1 | 34.4 | 35.7 | 37.8 |

TABLE 3(c)

| Composition and properties | Invention | | | | | | | | | | Reference | | | | |
|---|---|---|---|---|---|---|---|---|---|---|---|---|---|---|---|
| | A | B | C | C' | D | E | F | G | H | I | J | K | L | M | N |
| Crystal size ($\mu$m) | 19 | 18 | 18 | 17 | 16 | 16 | 16 | 16 | 15 | 15 | 17 | 15 | 50 | 43 | 25 |
| Defect size ($\mu$m) | 30 | 38 | 32 | 33 | 31 | 32 | 28 | 29 | 26 | 26 | 55 | 26 | 86 | 77 | 52 |
| Bending strength of unglazed 12 mm dia. test piece (kg/cm$^2$) | 1,420 | 1,570 | 1,680 | 1,780 | 1,750 | 1,950 | 2,160 | 2,400 | 2,850 | 2,940 | 570 | 1,210 | 950 | 1,120 | 1,380 |
| Coefficient of thermal expansion (%, at 650° C.) | 0.524 | 0.467 | 0.360 | 0.271 | 0.326 | 0.308 | 0.440 | 0.345 | 0.365 | 0.366 | 0.398 | 0.327 | 0.463 | 0.415 | 0.402 |
| Acid resistivity (%) | 0.008 | 0.008 | 0.007 | 0.007 | 0.006 | 0.005 | 0.005 | 0.005 | 0.004 | 0.004 | 0.250 | 0.012 | 0.024 | 0.022 | 0.015 |
| Volume resistivity ($\times 10^{13}$ $\Omega$-cm, at 25° C) | 12 | 11 | 15 | 18 | 4.1 | 9.2 | 25 | 13 | 11 | 8.7 | — | 0.015 | 0.5 | 0.77 | 0.89 |
| Dielectric constant $\epsilon$ (50 Hz, at 25° C.) | 6.0 | 6.1 | 6.1 | 5.9 | 6.4 | 6.6 | 6.5 | 6.8 | 6.9 | 7.0 | — | 5.8 | 7.5 | 7.7 | 8.1 |
| Dielectric loss tangent tan $\delta$ ($\times 10^{-2}$, 50 Hz, at 25° C.) | 1.5 | 1.8 | 1.4 | 1.0 | 3.8 | 1.4 | 1.2 | 1.2 | 1.4 | 1.5 | — | 43 | 5.8 | 4.6 | 4.0 |
| Insulating strength (kV/cm) | 42 | 43 | 50 | 49 | 41 | 42 | 46 | 48 | 44 | 42 | — | 15 | 38 | 36 | 27 |

As can be seen from Table 3, Samples A to I of the porcelain according to the invention had a crystal size in a range of 15-18 $\mu$m and a defect size in a range of 26-38 $\mu$m. Their blend composition was in a range consisting of 33-80% of $SiO_2$, 16-63% of $Al_2O_3$, and 2.2-5.1% of $K_2O$ and/or $Na_2O$. The amounts of various crystals therein were not greater than 50% of corundum, 8-35% of mullite, not greater than 32% of cristobalite, and not greater than 9% of quartz, and the total degree of crystallinity was in a range of 42–66%. Their bending strength fell in a range of 1,420–2,940 kg/cm$^2$. More particularly, Sample E containing 18.8% of corundum had a bending strength of 1,950 kg/cm$^2$ and Sample I containing 49.2% of corundum had a bending strength of 2,940 kg/cm$^2$, so that the strength of such Samples proved to be improved by 30–40% as compared with porcelain which contained a similar amount of corundum but was made by a conventional method.

Reference Sample J, which used a calcination material with a composition outside the present invention, i.e., 10% of potash feldspar in the calcination material, resulted in an insufficient amount, i.e., 1.2% of K$_2$O and Na$_2$O. Thus, Reference Sample J was not sintered well and had comparatively large defects in the order of 55 μm and the bending strength thereof was merely 570 kg/cm$^2$. Reference Sample K containing 80% of potash feldspar in the calcination material resulted in a excessive amount, i.e., 7.3%, of K$_2$O and Na$_2$O, and its total degree of crystallinity was 16.1% and its bending strength was merely 1,210 kg/cm$^2$.

Reference Samples L through N, which were prepared by a conventional method, had crystals with a size in a range of 25–50 μm and a total degrees of crystallinity in a range of 34–38%, a defect size in range of 52–86 μm, and their bending strengths were 950–1,380 kg/cm$^2$.

Sample C' of the invention contained 5% of ZnO on the basis of the total of calcination material including the quartz type material, the feldspathic material, and the alumina type material, in order to obtain a high strength and a low thermal expansion. Such addition of ZnO proved to improve the bending strength by 100 kg/cm$^2$ and to reduce the coefficient of thermal expansion by about 0.09% at 650° C.

Samples A through I of the porcelain of the invention proved to have electric properties and acid resistivity which were better than those of Reference Samples L through N made by a conventional method.

Figure 5A:
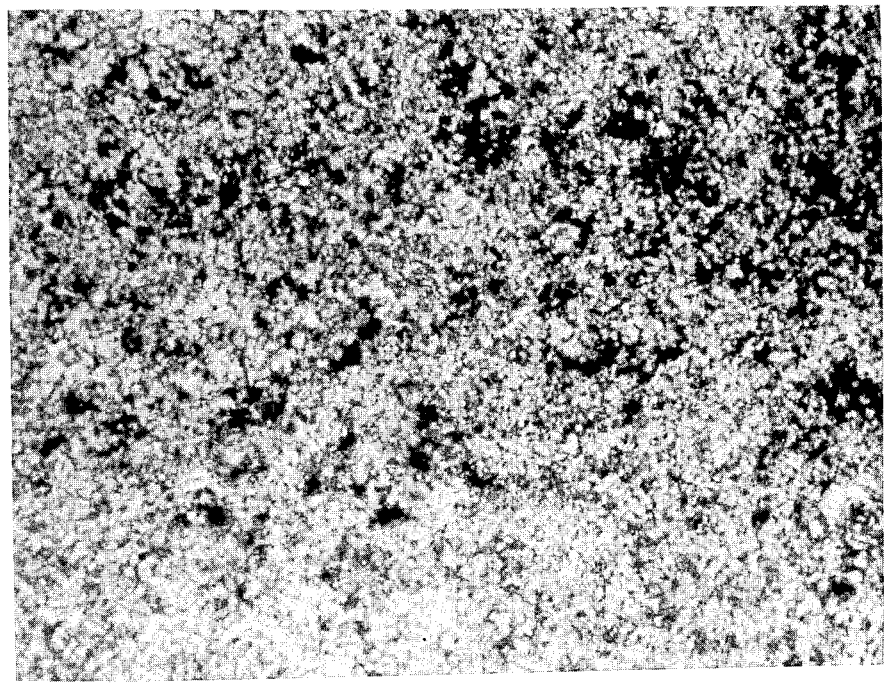
FIG. 5A is a photo microscopic, taken by an optical microscope of a penetration type, showing the microstructure of Sample F of Example 1 according to the invention.
Figure 5B:
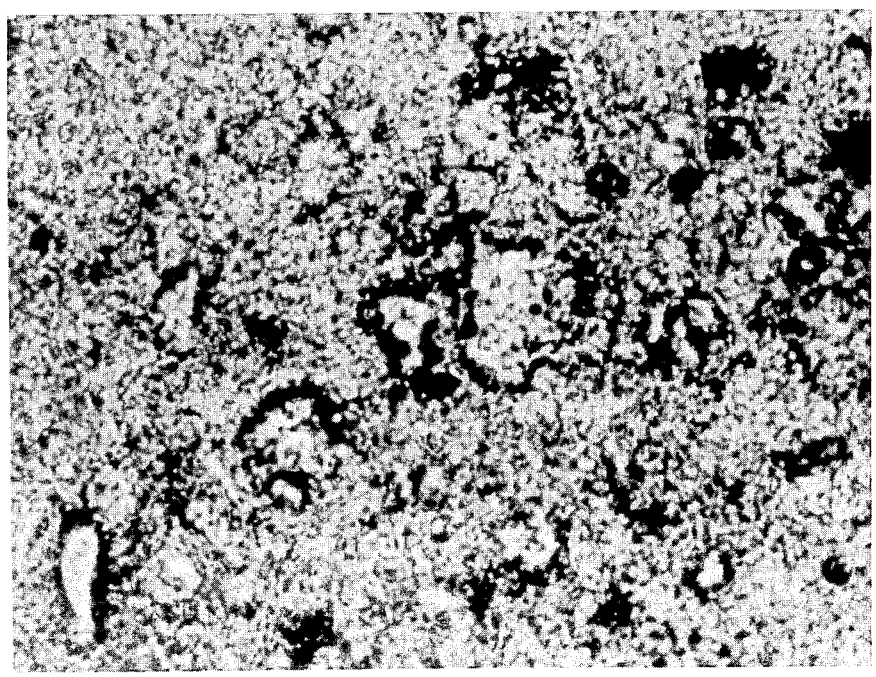
FIG. 5B is a photo microscopic, taken by an optical microscope of a penetration type, showing the microstructure of Reference Sample M of Example 1 produced by a conventional method.

FIG. 5A shows a photomicrograph of the microstructure of Sample F of the porcelain according to the invention, which photograph was taken by a penetration type optical microscope. For reference, FIG. 5B shows a similar photomicrograph of the microstructure of Reference Sample M made by a conventional method. As can be seen from the comparison of FIG. 5A and FIG. 5B, the porcelain made by the method of the invention has a more homogeneous microstructure than that of conventional porcelain.

EXAMPLE 2

Sample insulators were made by using the porcelain of the invention, because one of the features of the invention is in its application to large high-voltage insulators. Such sample insulators included solid insulators with shades as shown in FIG. 6 and two kinds of rod-like solid insulators; the dimensions of the solid insulator with shades were a cylindrical portion diameter of 145 mm, a shade portion diameter 230 mm, and an overall length of 1,150 mm, while a first kind of the rod-like solid insulator had an overall length of 1,150 mm and a cylindrical portion diameter of 165 mm and a second kind of rod-like solid insulator had an overall length of 1,150 mm and a cylindrical portion diameter of 185 mm.

The porcelain of Sample F of Example 1 was used for the sample insulators. Starting materials were siliceous sand as the quartz-type material, potash feldspar as the feldspathic material, α-Al$_2$O$_3$ as the alumina-type material, and elutriated gaerome clay as the clay-mineral material. The siliceous sand, potash feldspar, and α-Al$_2$O$_3$ were mixed at the ratio shown in Table 3 under the Sample F column for composition of calcined material, and the starting material mixture was pulverized through a wet process by using a trommel so as to make the particle size of 90% of particles thereof not greater than 10 μm. After deferrization by a ferro filter, the pulverized starting material mixture aas passed through a 44 μm mesh sieve and dehydrated by a filter press and dried by an electric drier. The dried starting material mixture was crushed by a roll crusher into particles not greater than 10 mm, and then continuously calcined at 1,150° C. by a rotary hearth kiln for baking tiles. The calcined mixture was coarsely crushed by a roll crusher into particles of not greater than 2 mm.

In mixing 69% of the calcined material and 31% of the gaerome clay as shown in Table 3, 15% of the gaerome clay was at first loaded into a trommel together with the calcined material. The remaining 16% of the gaerome clay was pulverized through a wet process in such a manner that when being added to the above mixture more than 80% of the particles have a particle size of not greater than 10 μm, and then such remaining gaerome clay was loaded into the trommel and thoroughly mixed. After deferrization by a ferro filter, the molding slip prepared by mixing the calcined material with the gaerome clay was passed through a 44 μm mesh sieve and dehydrated by a filter press. The dehydrated slip was extruded by a vacuum extruder so as to produce bodies with a diameter of 290–310 mm and an overall length of 1,800 mm. Thirty pieces of the above solid insulators with shades, thirty rod-like solid insulators of the above first kind, and thirty rod-like solid insulators of the above second kind were formed and dried. The dimensions of the solid insulators were all as mentioned above.

After drying, it was confirmed by inspection of all the insulators that no crack occurred at all during the drying (drying cracks) at either cylindrical portions or shade portions. After the inspection, the insulators were glazed and fired at 1,300°–1,350° C. in a continuous firing furnace. It was confirmed that the fired solid insulators with shades and rod-like solid insulators were all free from firing cracks and had good sintered conditions. The drying cracks were checked by inspection with the eye sight, and the firing cracks were checked by both the eye and an inside inspection with X-ray penetration. The sintered conditions were checked by a moisture absorption test on test pieces which were cut out from the central portions of the insulators.

The samples of the large high-voltage insulators of the invention, i.e., the solid insulator with shades having a cylindrical portion diameter of 145 mm, rod-like solid insulators with a diameter of 165 mm, and the rod-like solid insulators with a diameter of 185 mm, were produced in a manner similar to conventional porcelain production with a high stability but without any drying cracks and firing cracks.

As described in detail in the foregoing, high strength feldspathic porcelain and a method for producing the same in accordance with the invention facilitate formation of homogeneous porcelain microstructure by using finely pulverized materials and improve the mechanical strength of porcelain. In a method of the invention, of various starting materials, the quartz-type material, the feldspathic material, and the alumina-type material are finely pulverized, mixed and then calcined for providing a calcined material with a homogeneous microstructure, and then the clay-mineral material is added therein and the particle size distribution of the mixture is controlled, so that a suitable moldability is rendered to the body at each of the steps for kneading, extruding, forming, drying, and firing, whereby the occurrence of cracks is effectively prevented in the drying and firing processes.

The porcelain and the method of producing the same according to the invention contribute greatly to the art of large high-voltage insulators by providing very strong and compact insulators with excellent electric properties such as arc resistivity. Additionally, the porcelain of the invention has a high chemical resistivity such as acid resistivity.

Although the invention has been described with a certain degree of particularity, it is understood that the present disclosure has been made only by way of example and that numerous changes in details of construction and the combination and arrangement of ingredients and steps may be resorted to without departing from the scope of the invention as hereinafter claimed.

What is claimed is:

1. A method for producing high strength feldspathic porcelain having an unglazed bending strength of greater than 1,400 kg/cm² and said porcelain being free from defects greater than 40 μm, comprising the steps of preparing a starting material selected from the group consisting of quartz material, feldspathic material, alumina material and mixtures thereof; pulverizing the starting material so as to form 85-95% by weight thereof into particles having effective diameters of not greater than 10 μm; calcining the pulverized material at 900°-1,400° C.; mixing a clay-mineral material with the calcined material to form a mixture; pulverizing said mixture to result in not greater than 85% by weight thereof being particles with effective diameters of not greater than 10 μm; forming and drying the pulverized mixture; and firing the formed and dried mixture at 1,100°-1,400° C., whereby said porcelain thus produced contains a crystal phase of corundum in an amount of 20-60% by weight and at least one second crystal phase selected from the group consisting of corundum, mullite, cristobalite, and quartz, said crystal phases having a grain size of not greater than 20 μm and a total amount of crystalline phase of greater than 40% by weight.

2. A method for producing high strength feldspathic porcelain as set forth in claim 1, wherein said starting material after calcination consists essentially of not greater than 85% by weight of quartz material, 15-75% by weight of feldspathic material, and not greater than 85% by weight of alumina material.

3. A method for producing high strength feldspathic porcelain as set forth in claim 1, wherein said mixture consists essentially of 45-80% by weight of said calcined starting material and 20-55% by weight of the clay-mineral material.

4. A method for producing high strength feldspathic porcelain as set forth in claim 1, wherein said porcelain is for porcelain insulators.

5. A method for producing high strength feldspathic porcelain as set forth in claim 1, wherein said porcelain is acid resisting.

6. A method for producing high strength feldspathic porcelain having an unglazed bending strength of greater than 1,400 kg/cm² and said porcelain being free from defects greater than 40 μm, comprising the steps of preparing a starting material selected from the group consisting of quartz material, feldspathic material, alumina material and mixtures thereof; pulverizing the starting material so as to form 85-95% by weight thereof into particles having effective diameters of not greater than 10 μm; calcining the pulverized material at 900°-1,400° C.; pulverizing the calcined material; mixing a clay-mineral material with the calcined material so as to result in not greater than 85% by weight thereof being particles with effective diameters of not greater than 10 μm; forming and drying the pulverized mixture; and firing the formed and dried mixture at 1,100°-1,400° C., whereby said porcelain thus produced contains a crystal phase of corundum in an amount of 20-60% by weight and at least one second crystal phase selected from the group consisting of corundum, mullite, cristobalite, and quartz, said crystal phases having a grain size of not greater than 20 μm and a total amount of crystalline phase of greater than 40% by weight.

7. A method for producing high strength feldspathic porcelain as set forth in claim 6, wherein said starting material after calcination consists essentially of not greater than 85% by weight of quartz material, 15-75% by weight of feldspathic material, and not greater than 85% by weight of alumina material.

8. A method for producing high strength feldspathic porcelain as set forth in claim 6, wherein said porcelain is for porcelain insulators.

9. A method for producing high strength feldspathic porcelain as set forth in claim 8, wherein said mixture consists essentially of 45-80% by weight of said calcined starting material and 20-55% by weight of the clay-mineral material.

10. A method for producing high strength feldspathic porcelain as set forth in claim 6, wherein said porcelain is acid resisting.

11. A method for producing high strength feldspathic porcelain having an unglazed bending strength of greater than 1,400 kg/cm² and said porcelain being free from defects greater than 40 μm, comprising the steps of preparing a starting material selected from the group consisting of quartz material, feldspathic material, alumina material and mixtures thereof; pulverizing the starting material so as to form 85-95% by weight thereof into particles having effective diameters of not greater than 10 μm; calcining the pulverized material at 900°-1,400° C.; mixing a clay-mineral material with the calcined material to form a mixture; pulverizing said mixture to result in not greater than 80% by weight thereof being particles with effective diameters of not greater than 10 μm; forming and drying the pulverized mixture; and firing the formed and dried mixture at 1,100°-1,400° C., whereby said porcelain thus produced contains a crystal phase of corundum in an amount of 20-60% by weight and at least one second crystal phase selected from the group consisting of corundum, mullite, cristobalite, and quartz, said crystal phases having a grain size of not greater than 20 μm and a total amount of crystalline phase of greater than 40% by weight.

12. A method for producing high strength feldspathic porcelain as set forth in claim 11, wherein said starting material after calcination consists essentially of not greater than 85% by weight of quartz material, 15-75% by weight of feldspathic material, and not greater than 85% by weight of alumina material.

13. A method for producing high strength feldspathic porcelain as set forth in claim 11, wherein said mixture consists essentially of 45-80% by weight of said calcined starting material and 20–55% by weight of the clay-mineral material.

14. A method for producing high strength feldspathic porcelain as set forth in claim 11, wherein said porcelain is for porcelain insulators.

15. A method for producing high strength feldspathic porcelain as set forth in claim 11, wherein said porcelain is acid resisting.

16. A method of producing high strength feldspathic porcelain with an unglazed bending strength of greater than 1400 kg/cm$^2$, said porcelain consisting essentially of 22–85% by weight of $SiO_2$, 10–73% by weight of $Al_2O_3$, not greater than 1.5% by weight of $Fe_2O_3$, not greater than 1.5% by weight of $TiO_2$, not greater than 0.7% by weight of CaO, not greater than 0.5% by weight of MgO and 1.5–6.5% by weight of at least one oxide selected from the group consisting of $K_2O$ and $Na_2O$; said porcelain being free from defects greater than 40 μm, said method comprising the steps of preparing a starting material selected from the group consisting of quartz material, feldspathic material, and alumina material and mixtures thereof; pulverizing the starting material so as to form 85–95% by weight thereof into particles having effective diameters of not greater than 10 μm; calcining the pulverized material at 900°–1,400° C.; mixing a clay-mineral material with the calcined material to form a mixture; pulverizing said mixture to result in not greater than 85% by weight thereof being particles with effective diameters of not greater than 10 μm; forming and drying the pulverized mixture; and firing the formed and dried mixture at 1,100°–1,400° C., whereby said porcelain thus produced contains a crystal phase of corundum in an amount of 20–60% by weight and at least one second crystal phase selected from the group consisting of corundum, mullite, cristobalite, and quartz, said crystal phases having a grain size of not greater than 20 μm and a total amount of crystalline phase of greater than 40% by weight.

17. A method for producing high strength feldspathic porcelain as set forth in claim 16, wherein said starting material after calcination consists essentially of not greater than 85% by weight of quartz material, 15–75% by weight of feldspathic material, and not greater than 85% by weight of alumina material.

18. A method for producing high strength feldspathic porcelain as set forth in claim 16, wherein said mixture consists essentially of 45–80% by weight of said calcined starting material and 20–55% by weight of the clay-mineral material.

19. A method for producing high strength feldspathic porcelain as set forth in claim 16, wherein said porcelain is for porcelain insulators.

20. A method for producing high strength feldspathic porcelain as set forth in claim 16, wherein said porcelain is acid resisting.

* * * * *